(12) United States Patent
Blackburn

(10) Patent No.: US 8,100,377 B1
(45) Date of Patent: Jan. 24, 2012

(54) PIN MOUNT ASSEMBLIES AND METHODS

(75) Inventor: John P. Blackburn, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/874,759

(22) Filed: Sep. 2, 2010

(51) Int. Cl.
*A47F 7/14* (2006.01)

(52) U.S. Cl. ............... 248/475.1; 248/274.1; 248/278.1

(58) Field of Classification Search ............. 248/274.1, 248/278.1, 466, 475.1, 481, 482; 359/819, 359/822

See application file for complete search history.

(56) References Cited

U.S. PATENT DOCUMENTS

| | | | |
|---|---|---|---|
| 4,733,945 A | 3/1988 | Bacich | |
| 5,419,522 A * | 5/1995 | Luecke et al. | 248/288.51 |
| 6,016,230 A | 1/2000 | Nunnally et al. | |
| 6,934,096 B1 * | 8/2005 | Takeshita et al. | 359/819 |
| 7,073,952 B2 * | 7/2006 | Wu et al. | 385/62 |
| 7,982,980 B2 * | 7/2011 | Rigney | 359/822 |

* cited by examiner

*Primary Examiner* — Ramon Ramirez

(57) ABSTRACT

There is provided in one embodiment a polymer pin assembly for an optical mount. The assembly comprises two cap members, each cap member having a through opening. The assembly further comprises two cup members, each cup member being coupled to each respective cap member. The assembly further comprises two ball bearing members, each ball bearing member being disposed within each respective cup member. The assembly further comprises a rod member inserted through each cap member and coupled to each ball bearing member. The assembly further comprises a polymer material applied to interior portions of the cap members and applied to interior portions of the cup members after the polymer pin assembly is mounted to the optical mount.

22 Claims, 13 Drawing Sheets

PIN MOUNT ASSEMBLIES AND METHODS

FIELD

The disclosure relates generally to mounting devices and methods for optical elements and, more particularly, to mounting devices and methods for optical mounts.

BACKGROUND

Optical devices, such as lenses and mirrors, are typically coupled to a mechanical assembly by a mount, commonly referred to as an optical mount. An optical mount is typically in the form of a spring-loaded mechanism, intended to maintain the position of a reflective or transmissive optical element, while providing tip, tilt and piston adjustments. The stiffness of springs used in the optical mount usually dictates the stability of the optical mount under shock and vibration loading. However, as spring force of the springs is increased for stability, adjustment screws in the optical mount may need increasingly coarse threads to prevent stripping. Thus, the mount stiffness and the resolution of the adjustments can be competing parameters. Moreover, the optical mount typically includes an optical element, such as a minor cell, which can be disturbed in such a way that the contact between the mirror cell and the adjustment screws can be lost. This occurs whenever the product of the minor cell mass, and the acceleration due to shock or vibration acting on the minor cell, exceeds the spring force. At accelerations below that required to dislodge the minor cell, the minor cell does not move. Similarly, when exposed to accelerations that tend to force the minor cell against the adjustment screws, the mirror cell does not move. Thus, the dynamics of the mirror cell in response to acceleration are nonlinear. Of practical consequence is that when dislodged by acceleration, the minor cell may not necessarily return precisely to the original position. In such cases, the optical mount may be dislodged out of alignment. The spring force can be increased in order to improve the stability of the optical mount so that increasingly larger levels of acceleration can be tolerated without dislodging the mirror cell. However, the adjustment screws may then have to support the spring force. The fine pitch screws required for high-resolution adjustments can exhibit large thread stresses when acted upon by high spring forces. When the spring force exceeds the capacity of the adjustment screws, the threads can be stripped off the shanks of the adjustment screws. Optical mounts which are difficult to align, or that fail to hold alignment, can be labor intensive and can impact performance.

Methods for mounting optical lenses are known. One known method for mounting optical lenses uses epoxy bonding of the structures supporting the lenses. However, the epoxy bonds are not applied between surfaces that are articulated with respect to one another by an adjustment mechanism. In addition, known optical mounts typically provide only minimal conduction of heat from the supported optical lens or minor cell to the surface to which the optical mount is attached. Heat can accumulate rapidly in optics employed in High Energy Laser (HEL) applications. The rate of conduction heat transfer is proportional to the cross-sectional area of the conduction path. In known optical mounts, the only available conduction path is typically through the springs and the adjustment screws, both of which contact the mechanism over minimal areas.

Accordingly, there is a need in the art for an improved mounting assembly and methods for an optical mount that provides advantages over known assemblies and methods.

SUMMARY

This need for an improved mounting assembly and methods for an optical mount is satisfied. An improved mounting assembly and methods are provided for mounting optical elements that exhibit very low mass, very high stiffness (high structural frequencies), and high stability (does not change when exposed to shock or vibration disturbances). The mounting assembly and methods allow very fine pitch adjustment element assemblies, such as adjustment screw assemblies, to be used in conjunction with bias elements, such as soft extension or compression springs, simultaneously. Once the desired tip, tilt and piston adjustments and orientation of the optical mount are accomplished, the optical mount is "frozen" or set in place with the use of a polymer pin assembly injected with a polymer material such as an epoxy. The polymer material is applied between surfaces that are articulated with respect to one another by an adjustment mechanism. Once the optical mount is frozen in place, the adjustment screws and the extension or compression springs may be removed, which reduces the structural mass and weight of the optical mount and results in a lightweight optical mount. The improved mounting assembly and methods allow the stiffness and stability of the optical mount to be independent of the adjustment resolution and to be limited only by the stiffness of the structures (mirror cell and mount frame) of the optical mount.

In an embodiment of the disclosure, there is provided a polymer pin assembly for an optical mount. The assembly comprises two cap members, each cap member having a through opening. The assembly further comprises two cup members, each cup member being coupled to each respective cap member. The assembly further comprises two ball bearing members, each ball bearing member being disposed within each respective cup member. The assembly further comprises a rod member inserted through each cap member and coupled to each ball bearing member. The assembly further comprises a polymer material applied to interior portions of the cap members and applied to interior portions of the cup members after the polymer pin assembly is mounted to the optical mount.

In another embodiment of the disclosure, there is provided an epoxy pin assembly for mounting to an optical mount. The assembly comprises a first cap member having a through opening with an interior threaded portion for threaded attachment to a first cup member having an exterior threaded portion. The assembly further comprises a second cap member having a through opening with an interior threaded portion for threaded attachment to a second cup member having an exterior threaded portion. The assembly further comprises a first ball bearing member having an interior threaded portion and being disposed within an interior portion of the first cup member. The assembly further comprises a second ball bearing member having a through opening and being disposed within an interior portion of the second cup member. The assembly further comprises a rod member inserted through each cap member and having a first end with an exterior threaded portion for threaded attachment to the interior threaded portion of the first ball bearing member, and the rod member having a second end for insertion through the second ball bearing, so as to form a spaced coupling between the first cap member with the attached first cup member and the second cap member with the attached second cup member. The assembly further comprises one or more seal members inserted into one or more interiors of the first and second cap members and into one or more interiors of the first and second cup members. The assembly further comprises an epoxy material applied to interior portions of the first and second cap members and applied to interior portions of the first and second cup members after the epoxy pin assembly is mounted to the optical mount. The epoxy material causes the optical mount to be fixed in place which allows for removal of one or more adjustment element assemblies from the optical mount and allows for removal of one or more bias elements from the optical mount, thus resulting in a reduced overall weight of the optical mount.

In another embodiment of the disclosure, there is provided a polymer pin optical mount. The polymer pin optical mount comprises a mount frame assembly, an optical element coupled to the mount frame assembly via one or more retaining elements, one or more removable adjustment element assemblies attached to the mount frame assembly for adjusting orientation of the optical element with respect to the mount frame assembly, and one or more removable bias elements attached to the mount frame assembly for holding the optical element against the one or more adjustment element assemblies. The polymer pin optical mount further comprises one or more removable polymer pin assemblies mounted to the polymer pin optical mount via one or more pin mounting assemblies. The polymer pin assembly comprises two cap members, each cap member having a through opening. The polymer pin assembly further comprises two cup members, each cup member being coupled to each respective cap member. The polymer pin assembly further comprises two ball bearing members, each ball bearing member being disposed within each respective cup member. The polymer pin assembly further comprises a rod member coupled to each ball bearing member and inserted through each cap member. The polymer pin assembly further comprises a polymer material applied to interior portions of the cap members and applied to interior portions of the cup members after the polymer pin assembly is mounted to the optical mount. Preferably, the polymer material causes the polymer pin optical mount to be fixed in place which allows for removal of the one or more adjustment element assemblies from the polymer pin optical mount and allows for the removal of the one or more bias elements from the polymer pin optical mount, thus resulting in a reduced overall weight of the optical mount.

In another embodiment of the disclosure, there is provided a method for assembling a polymer pin assembly for an optical mount. The method comprises coupling a first cap member having a through opening to a first cup member. The method further comprises coupling a second cap member having a through opening to a first cup member. The method further comprises inserting a first ball bearing member into the first cup member. The method further comprises inserting a second ball bearing member into the second cup member. The method further comprises inserting a rod member through the first and second cap members. The method further comprises coupling the rod member to the first ball bearing and to the second ball bearing. The method further comprises applying a polymer material to interior portions of the cap members and to interior portions of the cup members after the polymer pin assembly is mounted to the optical mount. The method may further comprise before inserting the rod member, inserting one or more seal members into one or more interiors of the cap members and into one or more interiors of the cup members.

In another embodiment of the disclosure, there is provided a method for assembling an epoxy pin assembly for mounting to an optical mount. The method comprises threadably attaching a first cap member having a through opening and an interior threaded portion to a first cup member having an exterior threaded portion. The method further comprises threadably attaching a second cap member having a through opening and an interior threaded portion to a second cup member having an exterior threaded portion. The method further comprises inserting a first ball bearing member having an interior threaded portion into the first cup member. The method further comprises inserting a second ball bearing member having a through opening into the second cup member. The method further comprises inserting one or more seal members into one or more interiors of the first and second cap members and into one or more interiors of the first and second cup members. The method further comprises inserting a rod member through the first cap member and through the second cap member, the rod member having a first end with an exterior threaded portion and a second end. The method further comprises threadably attaching the first end of the rod member to the interior threaded portion of the first ball bearing member. The method further comprises inserting the second end of the rod member through the through opening of the second ball bearing member, so as to form a spaced coupling between the first cap member with the attached first cup member and the second cap member with the attached second cup member. The method further comprises applying an epoxy material to interior portions of the cap members and to interior portions of the cup members after the epoxy pin assembly is mounted to the optical mount. Preferably, the epoxy material causes the optical mount to be fixed in place which allows for removal of one or more adjustment element assemblies from the optical mount and allows for removal of one or more bias elements from the optical mount, thus resulting in a reduced overall weight of the optical mount.

In another embodiment of the disclosure, there is provided a method for adjusting an optical element using a polymer pin assembly for an optical mount. The method comprises providing an optical mount comprising the optical element, a mount frame assembly, one or more removable adjustment element assemblies, and one or more removable bias elements. The method further comprises providing one or more polymer pin assemblies. The polymer pin assembly comprises two cap members, each cap member having a through opening. The polymer pin assembly further comprises two cup members, each cup member being coupled to each respective cap member. The polymer pin assembly further comprises two ball bearing members, each ball bearing member being disposed within each respective cup member. The polymer pin assembly further comprises a rod member inserted through each cap member and coupled to each ball bearing member. The method further comprises mounting the one or more polymer pin assemblies to the optical mount. The method further comprises aligning the optical mount in order to adjust the optical element to a desired orientation. The method further comprises applying a polymer material to interior portions of the cap members and to interior portions of the cup members in order to fix the optical mount in place. The method further comprises curing the polymer material. The method further comprises removing the one or more removable adjustment element assemblies from the optical mount. The method further comprises removing the one or more removable bias elements from the optical mount. The method may further comprise before mounting the one or more polymer pin assemblies, inserting one or more seal members into one or more interiors of the cap members and into one or more interiors of the cup members.

In another embodiment of the disclosure, there is provided a method for adjusting an optical element using a polymer pin optical mount. The method comprises coupling the optical element to a polymer pin optical mount. The polymer pin optical mount comprises a mount frame assembly, one or more removable adjustment element assemblies, one or more removable bias elements, and one or more polymer pin assemblies. The polymer pin assembly comprises two cap members, each cap member having a through opening. The polymer pin assembly further comprises two cup members, each cup member being coupled to each respective cap member. The polymer pin assembly further comprises two ball bearing members, each ball bearing member being disposed within each respective cup member. The polymer pin assembly further comprises a rod member inserted through each cap member and coupled to each ball bearing member. The method further comprises aligning the polymer pin optical mount in order to adjust the optical element to a desired orientation. The method further comprises applying a polymer material to interior portions of the cap members and to interior portions of the cup members in order to fix the polymer pin optical mount in place. The method further comprises curing the polymer material. The method further comprises removing the one or more removable adjustment element assemblies from the polymer pin optical mount. The method further comprises removing the one or more removable bias elements from the polymer pin optical mount. The method may further comprise before aligning the polymer pin optical mount, inserting one or more seal members into one or more interiors of the cap members and into one or more interiors of the cup members.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 8 is an illustration of a front perspective view of an optical mount for which one of the embodiments of the polymer pin assembly of the disclosure can be mounted to and used with;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
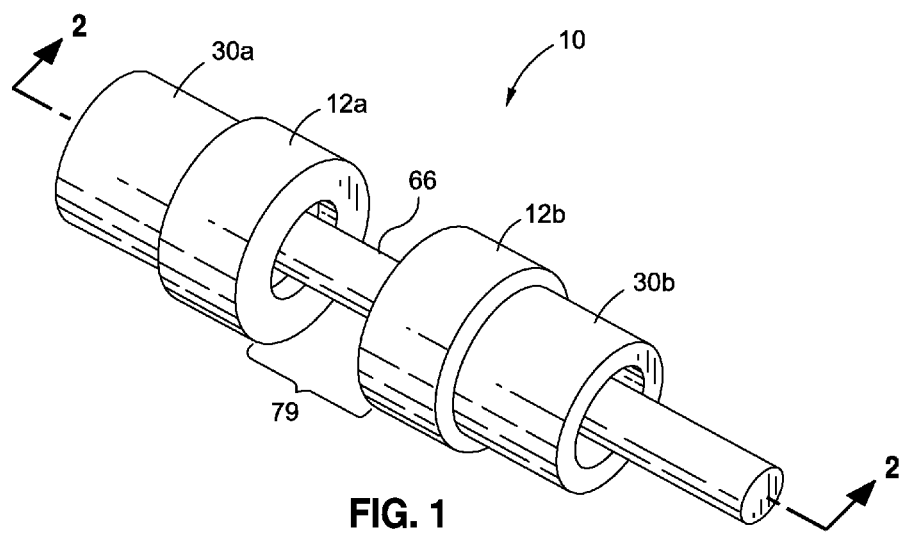
FIG. 1 is an illustration of a perspective view of one of the embodiments of the polymer pin assembly of the disclosure.
Figure 2:
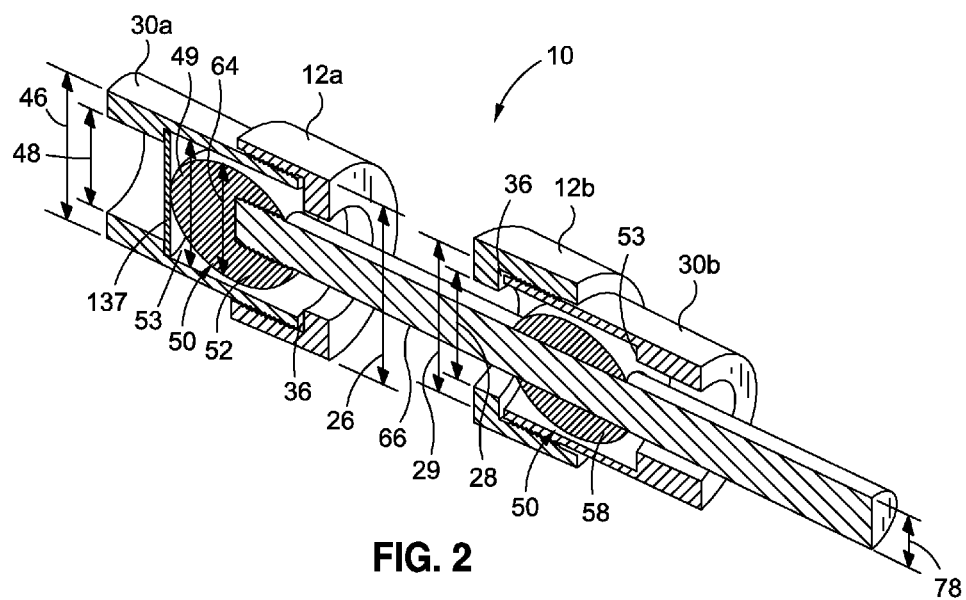
FIG. 2 is an illustration of a cross-sectional view of the polymer pin assembly taken along lines 2-2 of FIG. 1.
Figure 3:
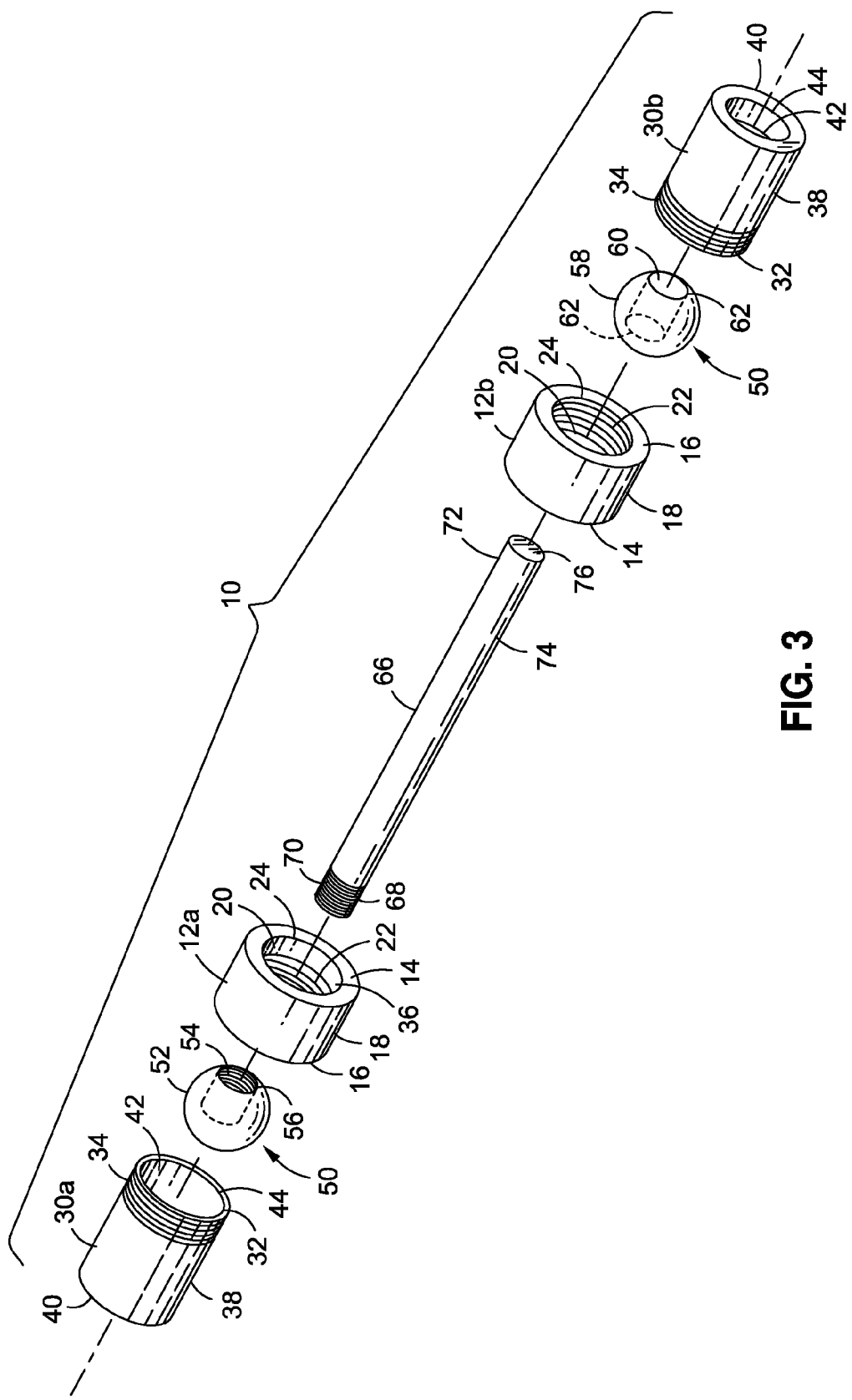
FIG. 3 is an illustration of an exploded view of the polymer pin assembly of FIG. 1.
Figure 8:
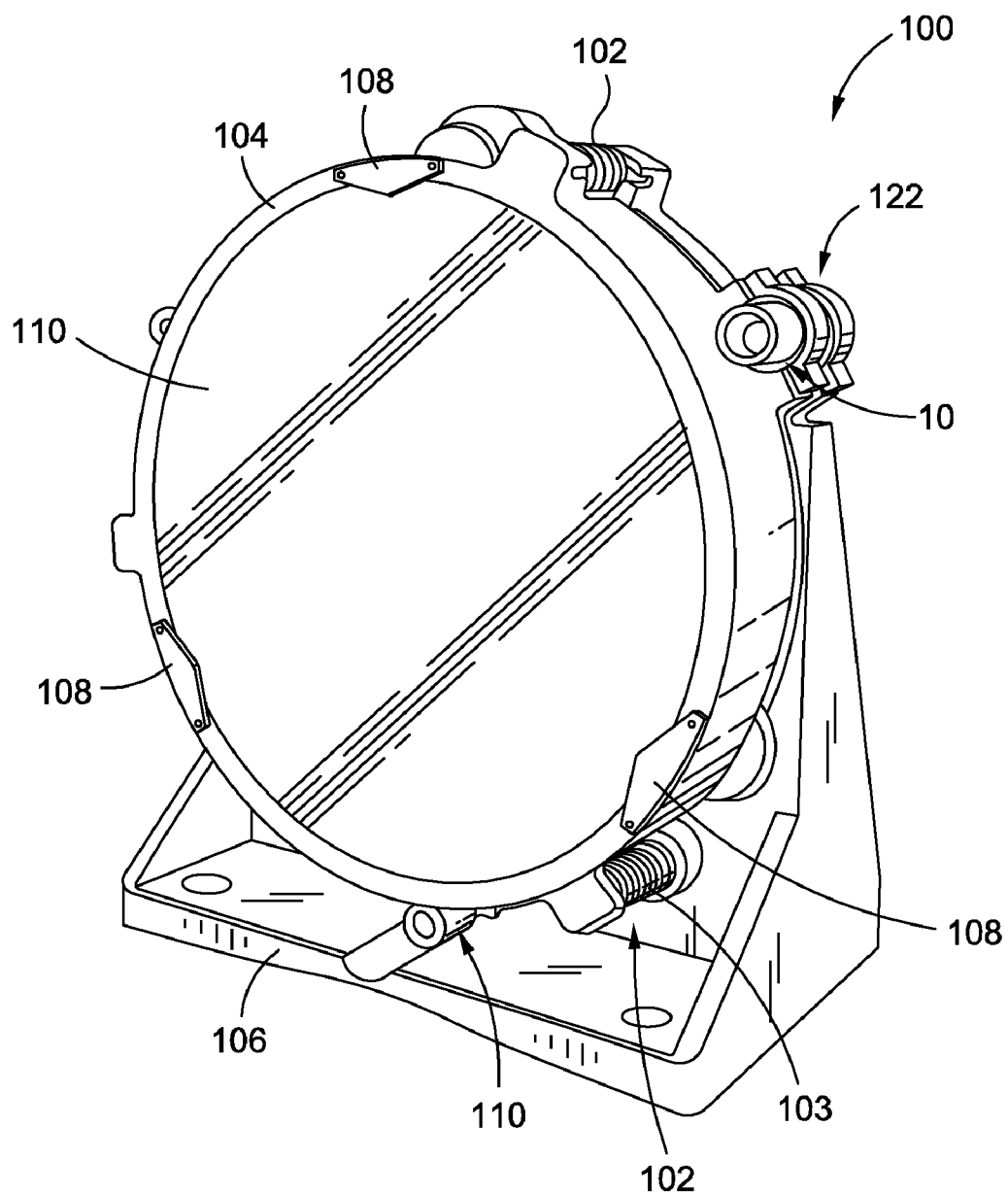

Referring to the Figures, FIG. 1 is an illustration of a perspective view of one of the embodiments of a polymer pin assembly 10 of the disclosure for mounting to and use with an exemplary optical mount 100 (see FIG. 8). The polymer pin assembly 10 is preferably removable from the optical mount 100. FIG. 2 is an illustration of a cross-sectional view of the polymer pin assembly 10 taken along lines 2-2 of FIG. 1. FIG. 3 is an illustration of an exploded view of the polymer pin assembly 10 of FIG. 1. In another one of the embodiments of the disclosure, there is provided a polymer pin optical mount 140 (see FIG. 16) that is designed with and incorporates one of the embodiments of the polymer pin assembly 10. The polymer pin optical mount 140 is preferably a device for mounting optical elements 104 that exhibits very low mass, very high stiffness (high structural frequencies), and high stability, that is, it does not change when exposed to shock or vibration disturbances. For purposes of this application, the terms "stiffness" and "stability" are used interchangeably. The polymer pin optical mount 140 is preferably an optical mount that is intended for use in weight-constrained, high-vibration/shock environments.

As shown in FIGS. 1-3, the polymer pin assembly 10 comprises a first cap member 12a and a second cap member 12b. Preferably, the first cap member 12a and the second cap member 12b are both hollow, the same size and dimension, and substantially cylindrical in shape. However, the first cap member 12a and the second cap member 12b may also be of another suitable shape. As shown in FIG. 3, the first cap member 12a and the second cap member 12b each comprise a first end 14, a second end 16, an exterior 18, an interior 20, and a through opening 24. The interior 20 preferably has an interior threaded portion 22. As shown in FIG. 2, the first cap member 12a and the second cap member 12b each have an outer diameter 26, a first inner diameter 28, and a second inner diameter 29. Preferably, the first inner diameter 28 is smaller than the second inner diameter 29. The length, width, and overall size of the first and second cap members 12a,12b are dependent on the size of the optical mount used, for example, a small optical mount would typically use a small polymer pin assembly with small first and second cap members 12a, 12b, and a large optical mount would typically use a larger polymer pin assembly with larger first and second cap members 12a, 12b. Preferably, the first and second cap members 12a, 12b are comprised of stainless steel or another suitable material. For optical mount applications, the material used for the first and second cap members 12a, 12b preferably exhibits a low coefficient of thermal expansion (CTE) and is selected to withstand various static or dynamic loads imposed on the optical mount. For applications involving heat traveling through the polymer pin assembly 10, the material used for the first and second cap members 12a, 12b preferably exhibits a high thermal conductivity. In addition, the material used for the first and second cap members 12a, 12b preferably exhibits good adhesion to the selected polymer material 132 applied to interior portions 136 (see FIG. 11) of the first and second cap members 12a, 12b, is stable over the life of the polymer pin assembly 10, meets any applicable outgassing requirements, and is resilient to the operating environment, such as ultraviolet rays, humidity, salt spray, or other operating environments.

As shown in FIGS. 1-3, the polymer pin assembly 10 further comprises a first cup member 30a and a second cup member 30b. Preferably, the first cup member 30a and the second cup member 30b are both hollow, the same size and dimension, and substantially cylindrical in shape. However, the first cup member 30a and the second cup member 30b may also be of another suitable shape. In addition, the first cup member 30a, in one embodiment, may comprise a wall portion 137 (see FIGS. 2 and 11) to close off the interior 42 of the first cup portion 30a. As shown in FIG. 3, the first cup member 30a and the second cup member 30b each comprise a first end 32 preferably having an exterior threaded portion 34 on an exterior surface 38. The first cup member 30a and the second cup member 30b each further comprises a second end 40 and an opening 44. The first cup member 30a is coupled to the first cap member 12a, and the second cup member 30b is coupled to the second cap member 12b. Preferably, the exterior threaded portion 34 of the first cup member 30a is threadably attached to the interior threaded portion 22 of the first cap member 12a until the first end 32 of the first cup member 30a abuts against an interior abutment portion 36 of the first cap member 12a. Preferably, the exterior threaded portion 34 of the second cup member 30b is threadably attached to the interior threaded portion 22 of the second cap member 12b until the first end 32 of the second cup member 30b abuts against the interior abutment portion 36 of the second cap member 12b. However, the first and second cup members 30a, 30b may also be coupled to the first and second cap members 12a, 12b via brazing, a press fit coupling, via adhesive, or another suitable coupling means. As shown in FIG. 2, the first cup member 30a and the second cup member 30b each have an outer diameter 46, a first inner diameter 48, and a second inner diameter 49. Preferably, the first inner diameter 48 is smaller than the second inner diameter 49. Preferably, the outer diameter 46 of the first and second cup members 30a, 30b is smaller than the outer diameter 26 of the first and second cap members 12a, 12b. The length, width, and overall size of the first and second cup members 30a, 30b are dependent on the size of the optical mount used, for example, a small optical mount would typically use a small polymer pin assembly with small first and second cup members 30a, 30b, and a large optical mount would typically use a larger polymer pin assembly with larger first and second cup members 30a, 30b. Preferably, the first and second cup members 30a, 30b are comprised of stainless steel, or another suitable material. For optical mount applications, the material used for the first and second cup members 30a, 30b preferably exhibits a low coefficient of thermal expansion (CTE) and is selected to withstand various static or dynamic loads imposed on the optical mount. For applications involving heat traveling through the polymer pin assembly 10, the material used for the first and second cup members 30a, 30b preferably exhibits a high thermal conductivity. In addition, the material used for the first and second cup members 30a, 30b preferably exhibits good adhesion to the selected polymer material 132 applied to interior portions 134 (see FIG. 11) of the first and second cup members 30a, 30b, is stable over the life of the polymer pin assembly 10, meets any applicable outgassing requirements, and is resilient to the operating environment, such as ultraviolet rays, humidity, salt spray, or other operating environments. Each of the first and second cup members 30a, 30b may further comprise a pin hole opening 139 (see FIGS. 7, 11) designed and sized for insertion of an injection needle or device (not shown) for injecting the polymer material 132 into interior portions 134 of the first and second cup members 30a, 30b.

The polymer pin assembly 10 further comprises two ball bearing members 50. Preferably, the ball bearing members 50 are substantially spherical in shape. As shown in FIG. 3, the ball bearing members 50 preferably comprise a first ball bearing member 52 having an opening 54 with an interior threaded portion 56 and comprise a second ball bearing member 58 having a through hole 60 formed through portions 62 of the second ball bearing 58. The first ball bearing member 52 is preferably inserted into the opening 44 at the first end 32 of the first cup member 30a and disposed within the interior 42 of the first cup member 30a, such that the first ball bearing member 52 abuts against an interior abutment portion 53 (see FIG. 2) of the first cup member 30a. The second ball bearing 58 is preferably inserted into the opening 44 at the first end 32 of second cup member 30b and disposed within the interior 42 of the second cup member 30b, such that the second ball bearing member 58 abuts against the interior abutment portion 53 (see FIG. 2) of the second cup member 30b. Each ball bearing member 50 is retained or captured by the first and second cup member 30a, 30b which are coupled to and partially capped by the first and second cap members 12a, 12b, respectively. As shown in FIG. 2, preferably, the ball bearing members 50 each have a diameter 64 that is equal in length. Preferably, the diameter 64 of the ball bearing members 50 is larger than the first inner diameter 48 of the first and second cup members 30a, 30b, and is smaller than the second inner diameter 49 of the first and second cup members 30a, 30b. Preferably, the diameter 64 of the ball bearing members 50 is smaller than the second inner diameter 29 of the first and second cap members 12a, 12b. The size of the ball bearing members 50 is dependent on the size of the optical mount used, for example, a small optical mount would typically use a small polymer pin assembly with small ball bearing members 50, and a large optical mount would typically use a larger polymer pin assembly with larger ball bearing members 50. Preferably, the ball bearing members 50 are comprised of stainless steel or another suitable material. For optical mount applications, the material used for the ball bearing members 50 preferably exhibits a low coefficient of thermal expansion (CTE) and is selected to withstand various static or dynamic loads imposed on the optical mount. For applications involving heat traveling through the polymer pin assembly 10, the material used for the ball bearing members 50 preferably exhibits a high thermal conductivity.

As shown in FIGS. 1-3, the polymer pin assembly 10 further comprises a rod member 66 that is preferably elongated. The length, width, and overall size of the rod member 66 are dependent on the size of the optical mount used, for example, a small optical mount would typically use a small polymer pin assembly with small rod member 66, and a large optical mount would typically use a larger polymer pin assembly with larger rod member 66. As shown in FIG. 3, the rod member 66 comprises a first end 68 having an exterior threaded portion 70 on an exterior surface 74 of the rod member 66. The rod member 66 further comprises a second end 72 and preferably has a solid interior 76. As shown in FIG. 2, preferably, the rod member 66 has a diameter 78 that is smaller than the diameter 64 of the ball bearing members 50. The rod member 66 is preferably inserted through the through openings 24 of the first and second cap members 12a, 12b. The rod member 66 is preferably coupled to the first and second ball bearing members 52, 58. The exterior threaded portion 70 of the first end 68 of the rod member 66 is preferably threadably attached to the interior threaded portion 56 of the first ball bearing member 52. The second end 72 of the rod member 66 is preferably inserted through the through opening 60 of the second ball bearing 58, so as to form a spaced coupling 79 (see FIG. 1) between the first cap member 12a with the attached first cup member 30a and the second cap member 12b with the attached second cup member 30b. The rod member 66 preferably comprises a material such as steel, copper, or another suitable material. For applications involving heat traveling through the polymer pin assembly 10, for example, high energy laser applications, the material used for the rod member 66 preferably exhibits a high thermal conductivity, such as copper, which facilitates conducting heat out of the optical system. For optical mount applications or if the polymer pin assembly 10 is not used with optical systems involving high energy laser applications or is used with optical systems where thermal conductivity is not an issue, the material used for the rod member 66 preferably exhibits a low coefficient of thermal expansion (CTE), such as steel, and is selected to withstand various static or dynamic loads imposed on the optical mount.

Figure 7:
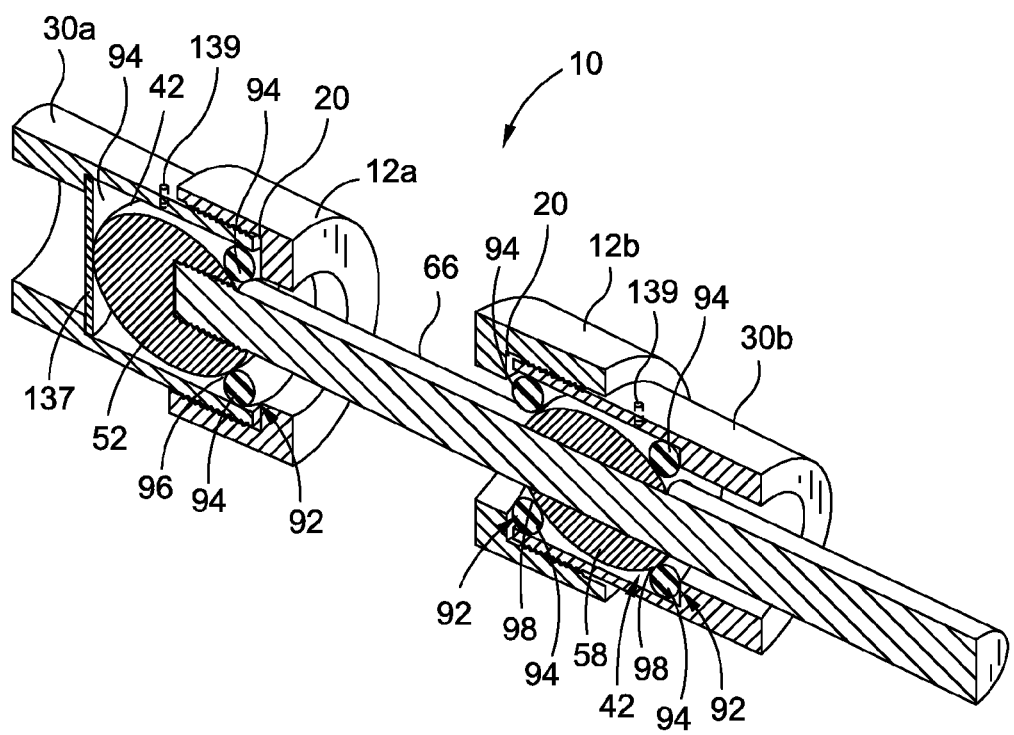
FIG. 7 is an illustration of a cross-sectional view of another one of the embodiments of the polymer pin assembly of the disclosure having seal elements.

FIG. 7 is an illustration of a cross-sectional view of another one of the embodiments of the polymer pin assembly 10 of the disclosure having one or more seal elements 92. As shown in FIG. 7, the polymer pin assembly 10 may further comprise one or more seal elements 92, preferably in the form of O-ring seal elements 94. However, the seal elements 92 may also comprise other suitable types of seal elements 94, such as any seal that is impenetrable by the polymer material used with the polymer pin assembly 10. One or more seal elements 92 may be added to one or more of the interiors 20 of the first and second cap members 12a, 12b. Further, one or more seal elements 92 may be added to the interior 42 of one or both of the first and second cup members 30a, 30b. The seal elements 92 preferably abut against the first ball bearing member 52 at area 96 (see FIG. 7). The seal elements 92 preferably abut against the second ball bearing member 58 at area 98 (see FIG. 7). The seal elements 92 may be added to the first and second cap members 12a, 12b and added to one or both of the first and second cup members 30a, 30b to prevent the polymer material 132 (see FIG. 11), preferably in the form of epoxy, from leaking or escaping from the polymer pin assembly 10. When sized properly, the seal elements 92 do not significantly impact the compliance of the polymer pin assemblies 10 before or after application of the polymer material 132, preferably in the form of epoxy, and they do not interfere with adjustment element assemblies 112 (see FIG. 9). The use of seal elements 92, preferably in the form of O-ring seal elements 94, can depend on the orientation of the polymer pin assembly 10 with respect to a gravity vector (G) 93 (see FIG. 11) before the polymer material 132 has cured.

Figure 11:
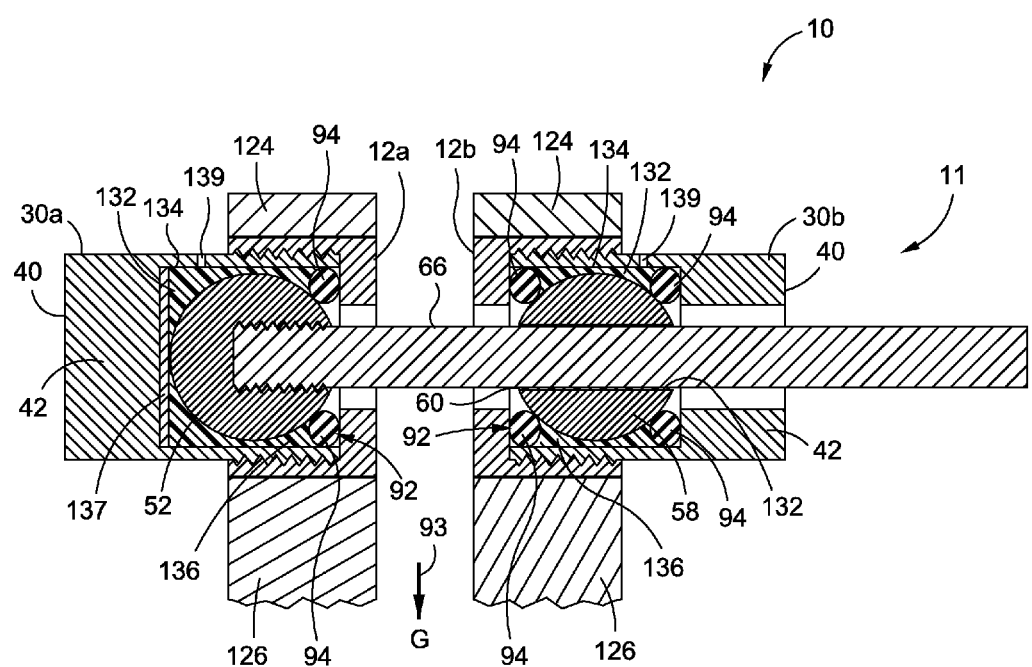
FIG. 11 is an illustration of a cross-sectional view of one of the embodiments of the polymer pin assembly of the disclosure showing the polymer material.

The polymer pin assembly 10 further comprises a polymer material 132 (see FIG. 11). FIG. 11 is an illustration of a cross-sectional view of one of the embodiments of the polymer pin assembly 10, in the form of an epoxy pin assembly 11, with the polymer material 132. Preferably, the polymer material 132 is in a liquid state when applied. However, the polymer material 132 may also comprise another suitable state, such as a gel or solid, when applied. Preferably, the polymer material 132 comprises a thermally conductive epoxy, a non-thermally conductive epoxy, a paraffin, or another suitable polymer material. More preferably, the polymer material 132 is an epoxy which applies permanent epoxy bonds. An alternative to applying permanent epoxy bonds is to use a phase change material, such as paraffin, in place of the epoxy. Such phase change materials change from a solid to a liquid at elevated temperatures. The benefit of using a phase change material is the ability to re-use the polymer pin assemblies. After the polymer pin assembly 10 is mounted to the optical mount 100, the polymer material 132 is preferably applied to interior portions 136 of the first and second cap members 12a, 12b, and is also preferably applied to interior portions 134 of the first and second cup members 30a, 30b. The polymer material 132 may also fill the interface between the through hole 60 of the second ball bearing member 58 and the rod member 66. Preferably, the polymer material 132 is applied via an injection process or another suitable application process. The polymer material 132 is preferably applied between surfaces, such as surfaces of the first and second cap members 12a, 12b and surfaces of the first and second cup members 30a, 30b, that are articulated with respect to one another by one or more adjustment element assemblies 112 (see FIG. 9). The polymer material may also be applied between other suitable surfaces that are articulated with respect to one another by one or more adjustment element assemblies 112. Preferably, the polymer material 132 is injected with an injection needle or device (not shown) inserted through pin holes 139 (see FIGS. 7, 11) formed in the first and second cup members 30a, 30b, such that the polymer material 132 fills or substantially fills the volume enclosed by the first and second cap members 12a, 12b surrounding the first and second cup members 30a, 30b. As shown in FIG. 11, the epoxy pin assembly 11 further comprises O-ring seal elements 94 to prevent the leakage of the polymer material 132 out of the epoxy pin assembly 11. In this embodiment, O-ring seal elements 94 are positioned in three locations, and the first cup member 30a has a wall portion 137 that closes off the interior 42 of the first cup member 30a so no O-ring seal element 94 is needed at that location. However, the O-ring seal elements 94 may be in more than three locations or less than three locations within the epoxy pin assembly 11. The polymer material 132 causes the optical mount 100 to be fixed in place or frozen once the polymer material 132 cures. This can allow for removal of one or more adjustment element assemblies 112 (see FIG. 9), such as adjustment screw assemblies 113 (see FIG. 9), from the optical mount 100. This can also allow for optional removal of one or more bias elements 102, such as extension springs 103 (see FIG. 9), from the optical mount 100. The removal of the one or more adjustment element assemblies 112 results in a reduced overall weight of the optical mount 100. The removal of the one or more bias elements 102 results in a further reduced overall weight of the optical mount 100.

Figure 4:
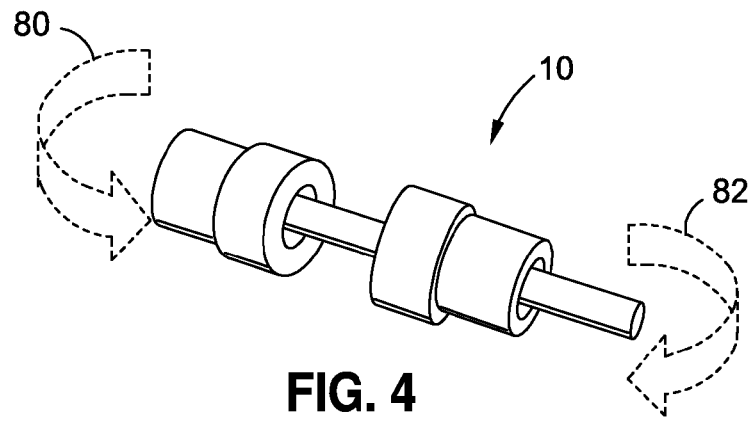
FIG. 4 is an illustration of forward and backward freedoms of movement of one of the embodiments of the polymer pin assembly of the disclosure.
Figure 5:
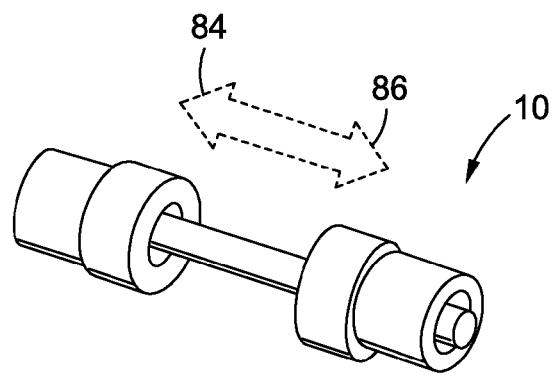
FIG. 5 is an illustration of left and right freedoms of movement of one of the embodiments of the polymer pin assembly of the disclosure.
Figure 6:
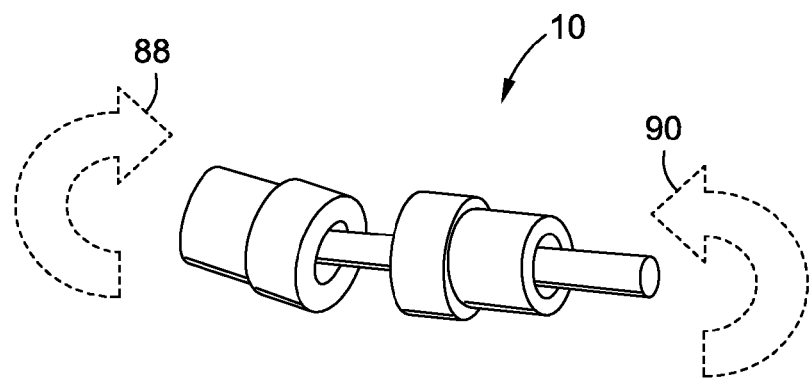
FIG. 6 is an illustration of up and down freedoms of movement of one of the embodiments of the polymer pin assembly of the disclosure.

Once assembled, the polymer pin assembly 10 is free to move in all six degrees of freedom, as shown in FIGS. 4-6. FIG. 4 is an illustration of a forward freedom of movement 80 and a backward freedom of movement 82 of one of the embodiments of the polymer pin assembly 10 of the disclosure. FIG. 5 is an illustration of left freedom of movement 84 and a right freedom 86 of movement of one of the embodiments of the polymer pin assembly 10 of the disclosure. FIG. 6 is an illustration of an up freedom of movement 88 and a down freedom of movement 90 of one of the embodiments of the polymer pin assembly 10 of the disclosure.

Figure 9:
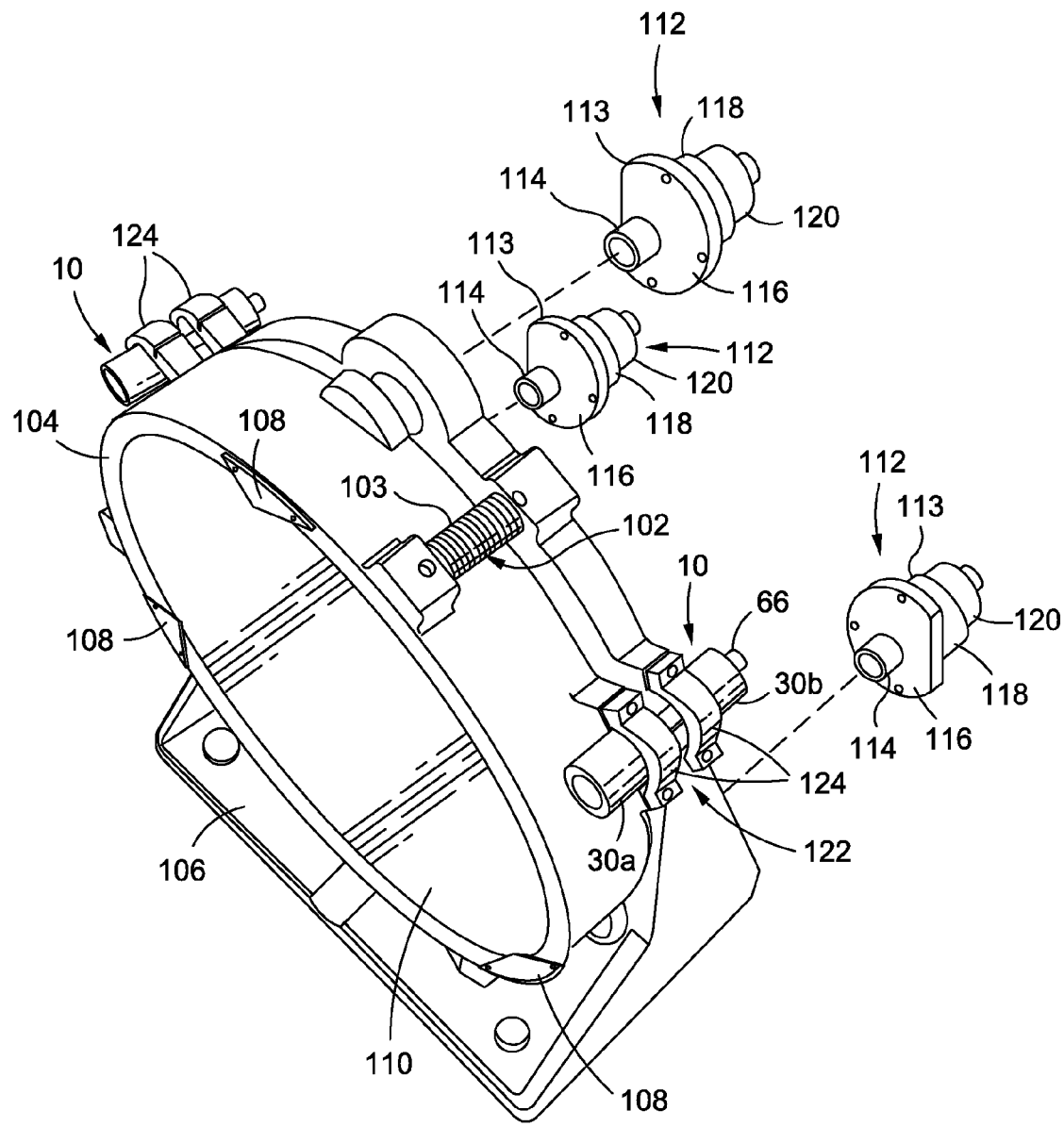
FIG. 9 is an illustration of a top perspective view of the optical mount of FIG. 8 showing adjustment element assemblies being removed from the optical mount.

FIG. 8 is an illustration of a front perspective view of an exemplary optical mount 100 for which one of the embodiments of the polymer pin assembly 10 of the disclosure can be mounted to and used with. FIG. 9 is an illustration of a top perspective view of the optical mount 100 of FIG. 8 showing adjustment element assemblies 112 being removed from the optical mount 100. The exemplary optical mount 110 may be an optical mount such as one available from Newport Corporation of Irvine, Calif. As shown in FIGS. 8-9, the optical mount 100 comprises a mount frame assembly 106. The optical mount 100 further comprises an optical element 104 coupled to the mount frame assembly 106 via one or more retaining elements 108. The optical element 104 preferably comprises a minor cell 110 or another suitable reflective or transmissive optical element. The optical mount 100 further comprises one or more removable adjustment element assemblies 112 (see FIG. 9) attached to the mount frame assembly 106 for adjusting orientation of the optical element 104 with respect to the mount frame assembly 106. Preferably, the optical mount 100 has three adjustment element assemblies 112. The adjustment element assemblies 112 may be in the form of adjustment screw assemblies 113 (see FIG. 9) or another suitable adjustment mechanism. As shown in FIG. 9, each adjustment element assembly 112, in the form of adjustment screw assembly 113, may comprise a screw portion 114, a bearing portion 116, a washer portion 118, and a nut portion 120. The optical mount 100 further comprises one or more removable bias elements 102 attached to the mount frame assembly 106 for holding the optical element 104 against the one or more adjustment element assemblies 112. Preferably, the optical mount 100 has three bias elements 102. The bias elements 102 may be in the form of extension springs 103 (see FIG. 9) or another suitable linear spring such as a compression spring.

Figure 10:
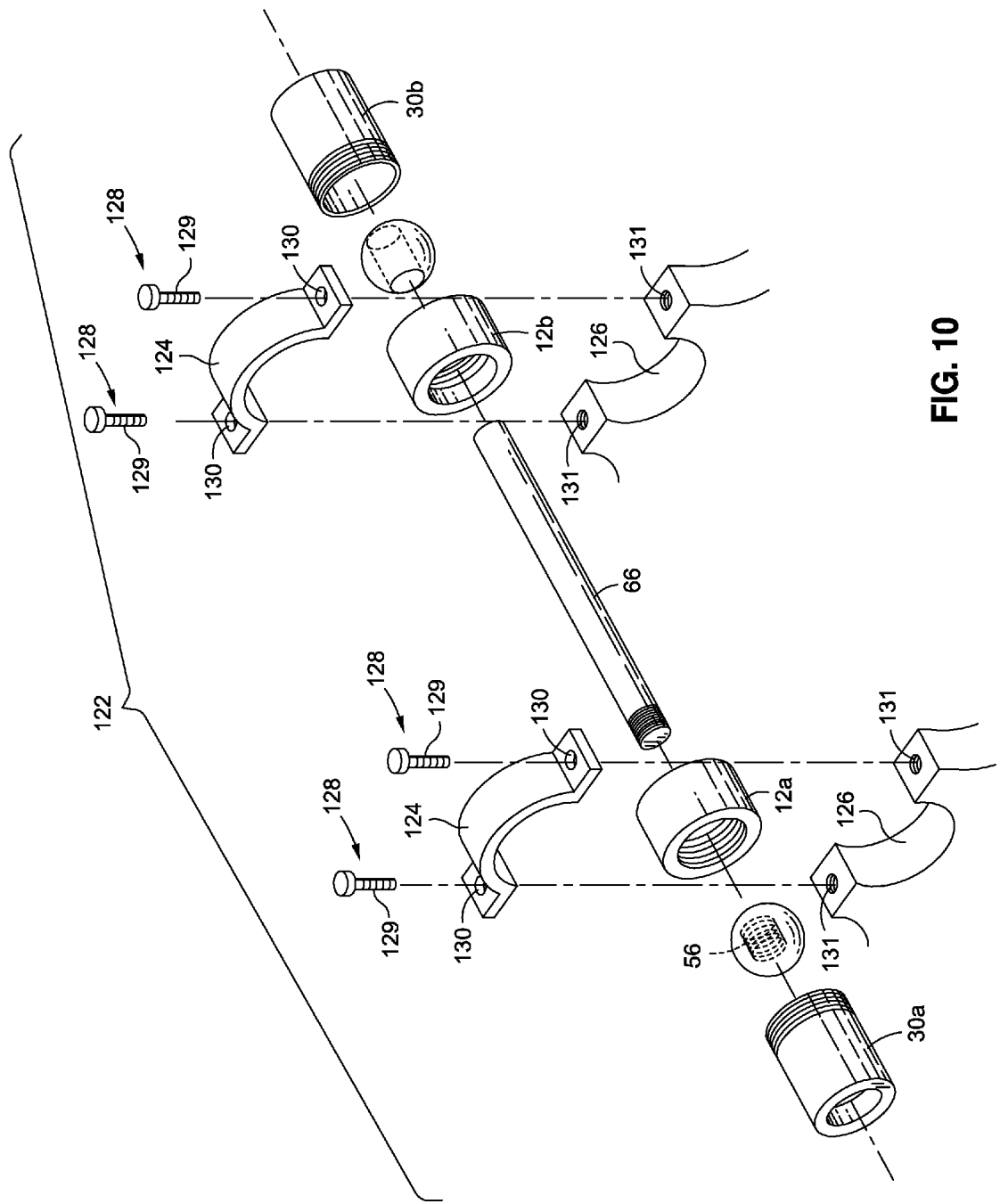
FIG. 10 is an illustration of an exploded view of the pin mounting assembly for mounting of the polymer pin assembly of the disclosure on the optical mount.

The optical mount 100 further comprises one of the embodiments of the one or more removable polymer pin assemblies 10, as discussed above, mounted to the optical mount 100 via one or more pin mounting assemblies 122 (see FIGS. 9-10). Preferably, three polymer pin assemblies 10 may be mounted to the optical mount 100 via three respective pin mounting assemblies 122. However, more than three polymer pin assemblies 10 may be mounted to the optical mount 100 with a respective number of pin mounting assemblies 122. As shown in FIGS. 8-9, the polymer pin assemblies 10 may be mounted to the optical mount 100 with pin mounting assembly 122. FIG. 10 is an illustration of an exploded view of the pin mounting assembly 122 for mounting of the polymer pin assembly 10 of the disclosure on or to the optical mount 100. The pin mounting assembly 122 comprises at least two upper retaining portions 124 attached to at least two corresponding lower base portions 126 via attachment elements 128 inserted through openings 130 in the upper retaining portions 124 and inserted through corresponding openings 131 in the lower base portions 126. The attachment elements 128 may comprise screws 129 or another suitable attachment element.

The polymer pin assembly 10, as discussed above, preferably comprises a first cap member 12a and a second cap member 12b, each cap member 12a, 12b having a through opening 20. The polymer pin assembly 10 further comprises a first cup member 30a and a second cup member 30b, each cup member 30a, 30b being coupled to each respective cap member 12a, 12b. Preferably, the coupling is a threaded coupling. The polymer pin assembly 10 further comprises two ball bearing members 50, each ball bearing member 50 being disposed within each respective cup member 30a, 30b. The polymer pin assembly 10 further comprises a rod member 66 coupled to each ball bearing member 50 and inserted through each cap member 12a, 12b. The polymer pin assembly 10 further comprises a polymer material 132 applied to interior portions 136 of the first and second cap members 12a, 12b and applied to interior portions 134 of the first and second cup members 30a, 30b after the polymer pin assembly 10 is mounted to the optical mount. Preferably, the polymer material 132 is a liquid polymer material that causes the polymer pin optical mount to be fixed in place, which allows for removal of the one or more adjustment element assemblies 112 from the polymer pin optical mount and allows for the removal of the one or more bias elements 102 from the polymer pin optical mount, thus resulting in a reduced overall weight of the polymer pin optical mount.

Before the optical mount 100 is fixed or frozen in place after the polymer material 132 is cured, the polymer pin assemblies 10 are compliant and have no effect on the adjustment mechanism of the optical mount 100. The three bias elements 102, in the form of extension springs 103, hold and compress the optical element 104, in the form of the mirror cell 110, against the three adjustment element assemblies 112, in the form of adjustment screw assemblies 113. Changes in the orientation, such as tip and tilt, of the minor cell 110, with respect to the mount frame assembly 106 are accomplished by rotation of the adjustment screw assemblies 113. Equal rotations of all three adjustment screw assemblies 113 move the minor cell 110 closer or farther away from the mount frame assembly 106, such as by piston (not shown) adjustment. Once the optical mount 110 is fixed or frozen in place after the polymer material 132 is cured, the extension springs 103 and the adjustment screw assemblies 113 are bypassed, and the stiffness of the extension springs 103 does not impact the stiffness or stability of the optical mount 100. This simultaneously allows for the use of screw portions 114 in the form of ultra-fine pitch adjustment screws, and also allows for the use of bias elements 102 in the form of soft extension springs 103.

Once the polymer material 132 has cured, the minor cell 110 is fixed or frozen in place with respect to the mount frame assembly 106. The adjustment element assemblies 112 may then be removed, as shown in FIG. 9. Like the adjustment element assemblies 112, the bias elements 102, preferably in the form of extension springs 103, no longer play a role in the dynamics of the optical mount 110. Thus, the bias elements 102 may also be removed, or alternatively, if the bias elements 102 are very lightweight, the bias elements 102 may be left in place with little weight penalty. If changes to the tip, tilt or piston adjustments are required, the cured polymer pin assemblies 10 may be discarded, and a new set of polymer pin assemblies 10 may be mounted or installed on the optical mount 100. The adjustment element assemblies 112 may be re-installed, the optical mount or polymer pin optical mount may be re-adjusted, and the new set of polymer pin assemblies 10 may be injected with liquid polymer material, preferably epoxy.

The structural stiffness of the fixed or frozen optical mount or polymer pin optical mount is preferably accomplished by linear Finite Element Analysis (FEA) methods. For purposes of this application, linear FEA is defined as a numerical technique for finding approximate solutions of partial differential equations (PDE) as well as of integral equations, and the solution approach is based either on eliminating the differential equation completely (steady state problems), or rendering the PDE into an approximating system of ordinary differential equations, which are then numerically integrated using standard known techniques. FEA typically comprises a computer model of a material or design that is stressed and analyzed for specific results. It can provide verification that a proposed design will be able to perform to specifications prior to manufacturing or construction. The types of analysis that may be used include two-dimensional (2-D) modeling and three-dimensional (3-D) modeling. A wide range of variables within the FEA are available for minimization or maximization, such variables including but not limited to, mass, volume, temperature, strain energy, stress strain, force, displacement, velocity, acceleration, and other suitable variables. FEA can show problem areas in a material and allows designers to see all of the theoretical stresses within. For the polymer pin assembly and polymer pin optical mount disclosed herein, since the fixed or frozen mirror cell 110 cannot be dislodged from the mount frame assembly 106, the FEA computer model is preferably of a continuous solid. The FEA computer model may be iterated so that only the minimum amount of structure or weight may be expended to achieve the required stiffness. As an example, the polymer pin optical mount disclosed herein can support a 4-inch optic, weighs < (less than) 0.9 lb (pound) (with the optical element 104 removed), and exhibits a stiffness of 486 Hz (Hertz) (with the optical element 104 installed). As a point of comparison, a known 4-inch optical mount, such as one obtained by Newport Corporation of Irvine, Calif., weighs over five pounds and exhibits a stiffness of 420 Hz (Hertz). In general, the weight of optical mounts increases with increasing stability and stiffness performance.

Figure 16:
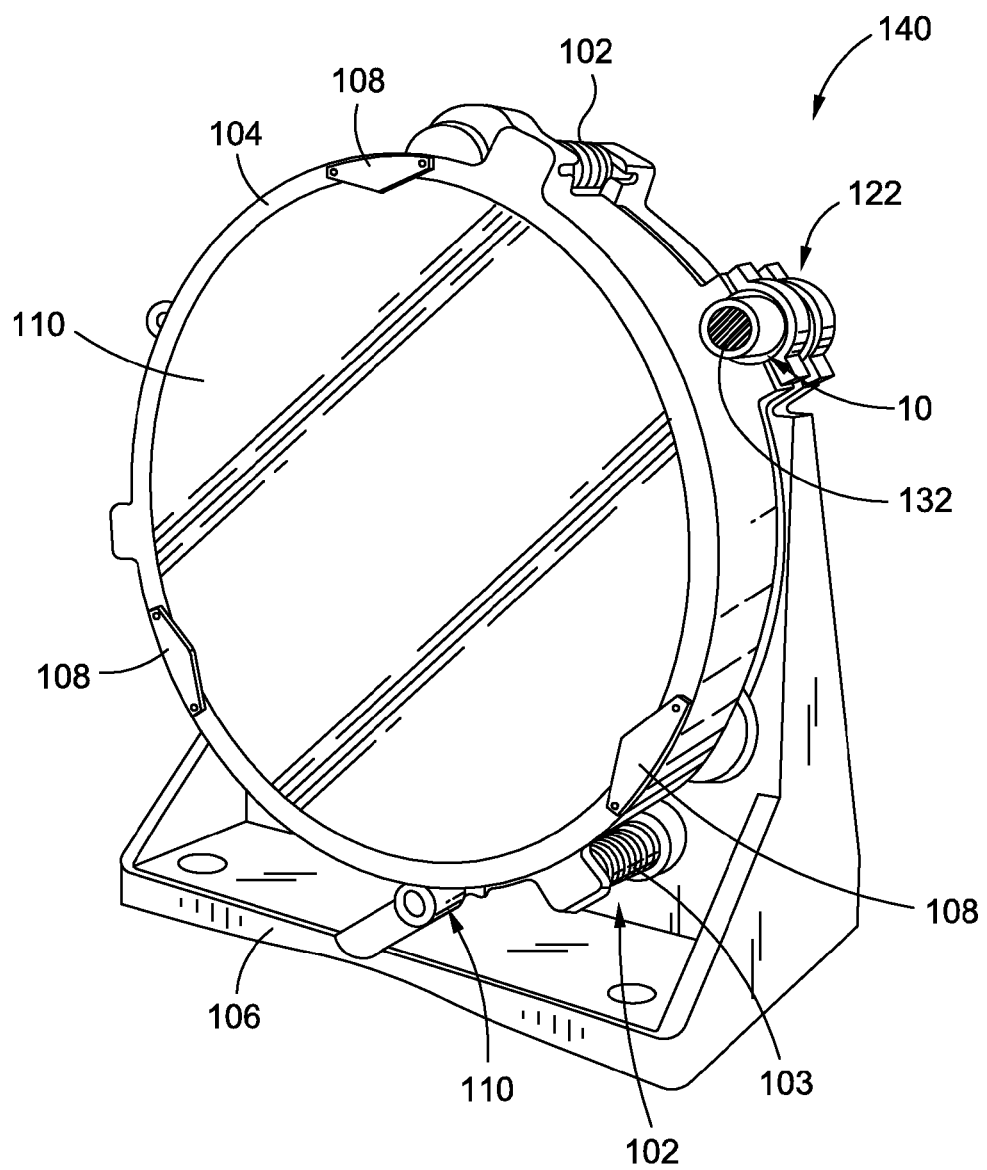

In another embodiment of the disclosure, there is provided a polymer pin optical mount 140 (see FIG. 16). FIG. 16 is an illustration of a front perspective view of one of the embodiments of a polymer pin optical mount 140 incorporating one of the embodiments of the polymer pin assembly 10 of the disclosure. The polymer pin optical mount 140 comprises a mount frame assembly 106. The polymer pin optical mount 140 further comprises an optical element 104 coupled to the mount frame assembly 106 via one or more retaining elements 108. The polymer pin optical mount 140 further comprises one or more removable adjustment element assemblies 112 (see FIG. 9) attached to the mount frame assembly 106 for adjusting orientation of the optical element 104 with respect to the mount frame assembly 106. The polymer pin optical mount 140 further comprises one or more removable bias elements 102, preferably in the form of extension springs 103, attached to the mount frame assembly 106 for holding the optical element 104 against the one or more adjustment element assemblies 112. The polymer pin optical mount 140 further comprises one or more removable polymer pin assemblies 10 mounted to the polymer pin optical mount 140 via one or more mounting assemblies 122. The polymer pin assembly 10, as discussed above and shown in FIGS. 1-3, 7 and 11, preferably comprises a first cap member 12a and a second cap member 12b, each cap member 12a, 12b having a through opening 20. The polymer pin assembly 10 further comprises a first cup member 30a and a second cup member 30b, each cup member 30a, 30b being coupled to each respective cap member 12a, 12b. Preferably, the coupling is a threaded coupling. The polymer pin assembly 10 further comprises two ball bearing members 50, each ball bearing member 50 being disposed within each respective cup member 30a, 30b. The polymer pin assembly 10 further comprises a rod member 66 coupled to each ball bearing member 50 and inserted through each cap member 12a, 12b. The polymer pin assembly 10 further comprises a polymer material 132, preferably a liquid polymer material, applied to interior portions 136 (see FIG. 11) of the first and second cap members 12a, 12b and applied to interior portions 134 (see FIG. 11) of the first and second cup members 30a, 30b after the polymer pin assembly 10 is mounted to the polymer pin optical mount 140. Preferably, the polymer material 132 causes the polymer pin optical mount 140 to be fixed or frozen in place which allows for removal of the one or more adjustment element assemblies 112 from the polymer pin optical mount 140 and allows for the removal of the one or more bias elements 102 from the polymer pin optical mount 140, thus resulting in a reduced overall weight of the polymer pin optical mount 140. The adjustment resolution of the polymer pin optical mount 140 is not related to the structural dynamics of the fixed or frozen polymer pin optical mount 140. A primary heat conduction path is through the polymer pin assemblies, rather than through the bias elements 102, such as extension springs 103, and through the adjustment element assemblies 112, such as adjustment screw assemblies 113.

Figure 12:
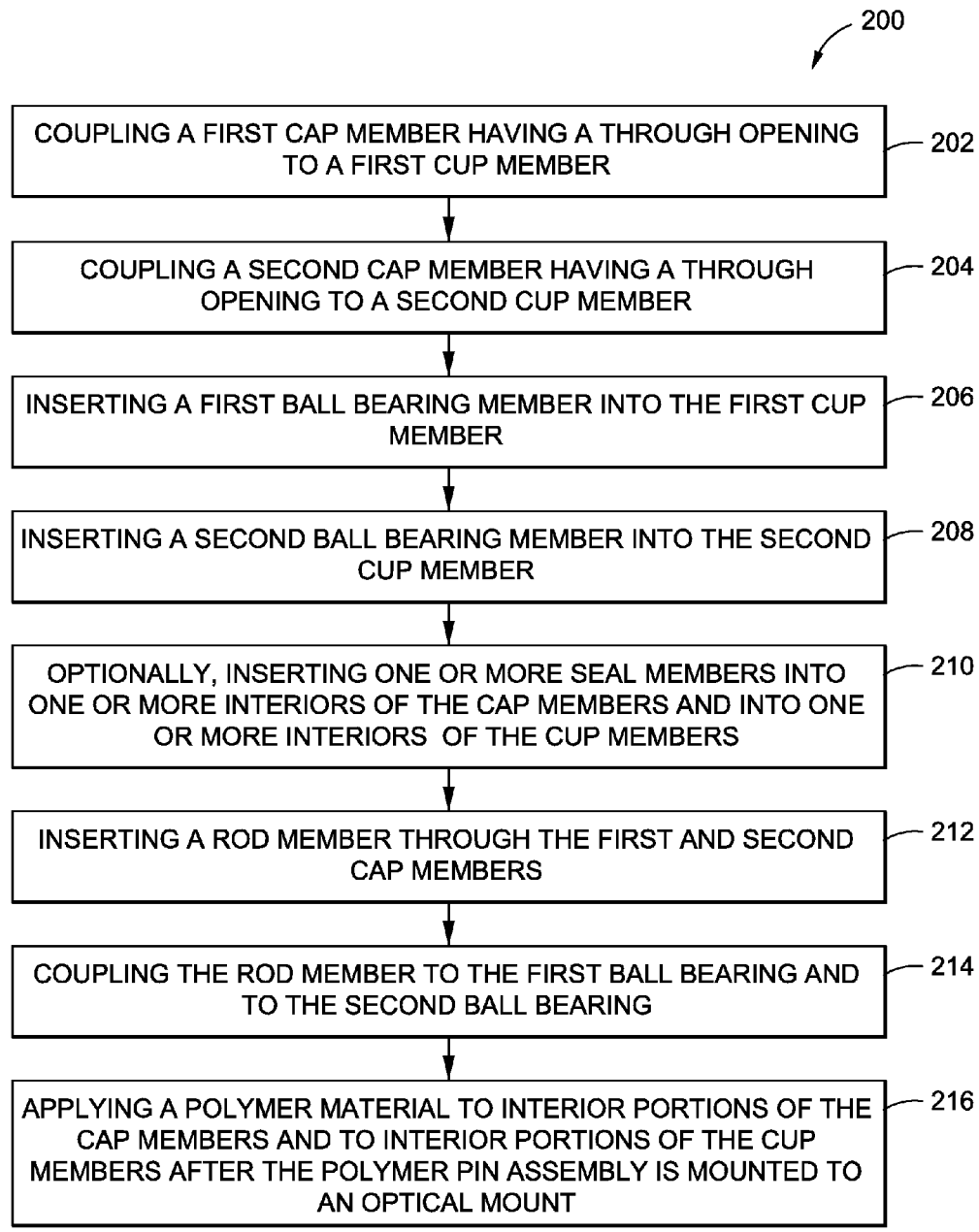
FIG. 12 is an illustration of a flow diagram of one of the embodiments of a method of the disclosure.

In another embodiment of the disclosure, there is provided a method 200 for assembling a polymer pin assembly 10 for an optical mount 100. FIG. 12 is an illustration of a flow diagram of the method 200 of the disclosure. The method 200 comprises step 202 of coupling a first cap member 12a (see FIG. 3) having a through opening 24, as discussed above, to a first cup member 30a (see FIG. 3) as discussed above. The method 200 further comprises step 204 of coupling a second cap member 12b (see FIG. 3) having a through opening 24 (see FIG. 3), as discussed above, to a second cup member 30b. The method 200 further comprises step 206 of inserting a first ball bearing member 52 (see FIG. 3) into the first cup member 30a. The method 200 further comprises step 208 of inserting a second ball bearing member 58 into the second cup member 30b. The method 200 may further comprise optional step 210 of inserting one or more seal members 92 in one or more of the interiors 20 of the first and second cap members 12a, 12b and in one or more of the interiors 42 of the first and second cup members 30a, 30b. The method 200 further comprises step 212 of inserting a rod member 66 through the first cap member 12a and through the second cap member 12b. The method 200 further comprises step 214 of coupling the rod member 66 to the first ball bearing 52 and to the second ball bearing 58. The method 200 further comprises step 216 of applying a polymer material 132, preferably a liquid polymer material, to interior portions 136 of the first and second cap members 12a, 12b and to interior portions 134 of the first and second cup members 30a, 30b after the polymer pin assembly 10 is mounted to the optical mount 100. Preferably, the polymer material 132 comprises a thermally conductive epoxy, a non-thermally conductive epoxy, a paraffin, or another suitable polymer material. Preferably, the polymer material 132 causes the optical mount 100 to be fixed or frozen in place which allows for removal of one or more adjustment element assemblies 112 from the optical mount 100 and allows for removal of one or more bias elements 102 from the optical mount 100, thus resulting in a reduced overall weight of the optical mount 100.

Figure 13:
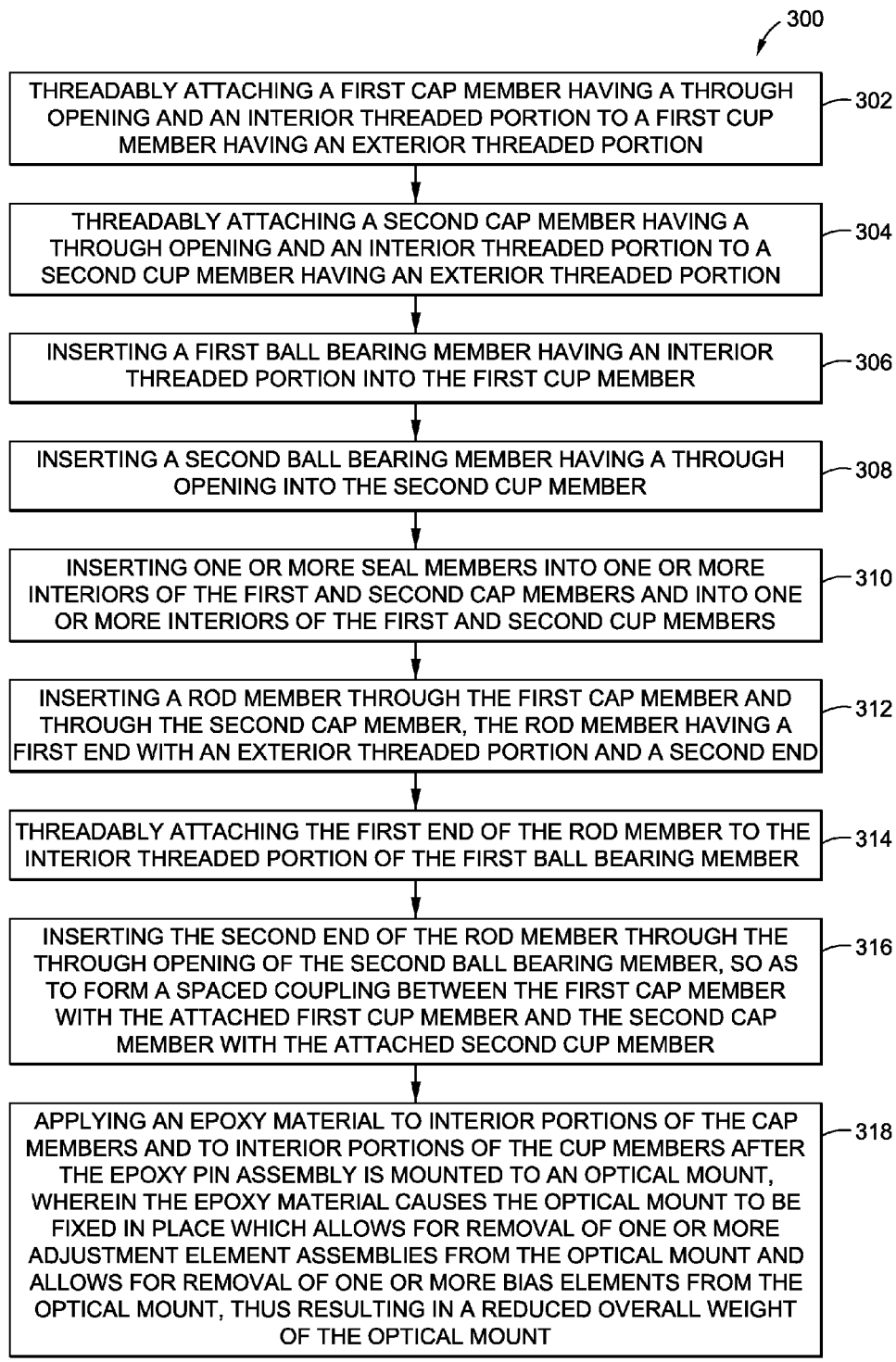
FIG. 13 is an illustration of a flow diagram of another embodiment of a method of the disclosure.

In another embodiment of the disclosure, there is provided a method 300 for assembling a polymer pin assembly 10, preferably in the form of an epoxy pin assembly 11 (see FIG. 11) for mounting to an optical mount 100 (see FIG. 9). FIG. 13 is an illustration of a flow diagram of the method 300 of the disclosure. The method 300 comprises step 302 of threadably attaching a first cap member 12a having a through opening 24 and an interior threaded portion 22 to a first cup member 30a having an exterior threaded portion 34 (see FIG. 3). The method 300 further comprises step 304 of threadably attaching a second cap member 12b having a through opening 24 and an interior threaded portion 22 to a second cup member 30b having an exterior threaded portion 34 (see FIG. 3). The method 300 further comprises step 306 of inserting a first ball bearing member 52 having an interior threaded portion 56 into the first cup member 30a (see FIG. 3). The method 300 further comprises step 308 of inserting a second ball bearing member 58 having a through opening 60 into the second cup member 30b. The method 300 further comprises step 310 of inserting one or more seal members 92 into one or more interiors 20 of the first and second cap members 12a, 12b and into one or more interiors 42 of the first and second cup members 30a, 30b. The method 300 further comprises step 312 of inserting a rod member 66, having a first end 68 with an exterior threaded portion 70 and a second end 72, through the first cap member 12a and through the second cap member 12b (see FIG. 3). The method 300 further comprises step 314 of threadably attaching the first end 68 of the rod member 66 to the interior threaded portion 56 of the first ball bearing member 58 (see FIG. 3). The method 300 further comprises step 316 of inserting the second end 72 of the rod member 66 through the through opening 60 of the second ball bearing member 58 (see FIG. 3), so as to form a spaced coupling 79 (see FIG. 1) between the first cap member 12a with the attached first cup member 30a and the second cap member 12b with the attached second cup member 30b. The method 300 further comprises step 318 of applying a polymer material 132, preferably an epoxy material, to interior portions 136 (see FIG. 11) of the first and second cap members 12a, 12b and to interior portions 134 (see FIG. 11) of the first and second cup members 30a, 30b after the epoxy pin assembly 11 is mounted to the optical mount 100. Preferably, the polymer material 132 in the form of epoxy material, causes the optical mount 100 to be fixed or frozen in place which allows for removal of one or more adjustment element assemblies 112 (see FIG. 9) from the optical mount 100 and allows for removal of one or more bias elements 102 (see FIG. 9) from the optical mount 100, thus resulting in a reduced overall weight of the optical mount 100.

Figure 14:
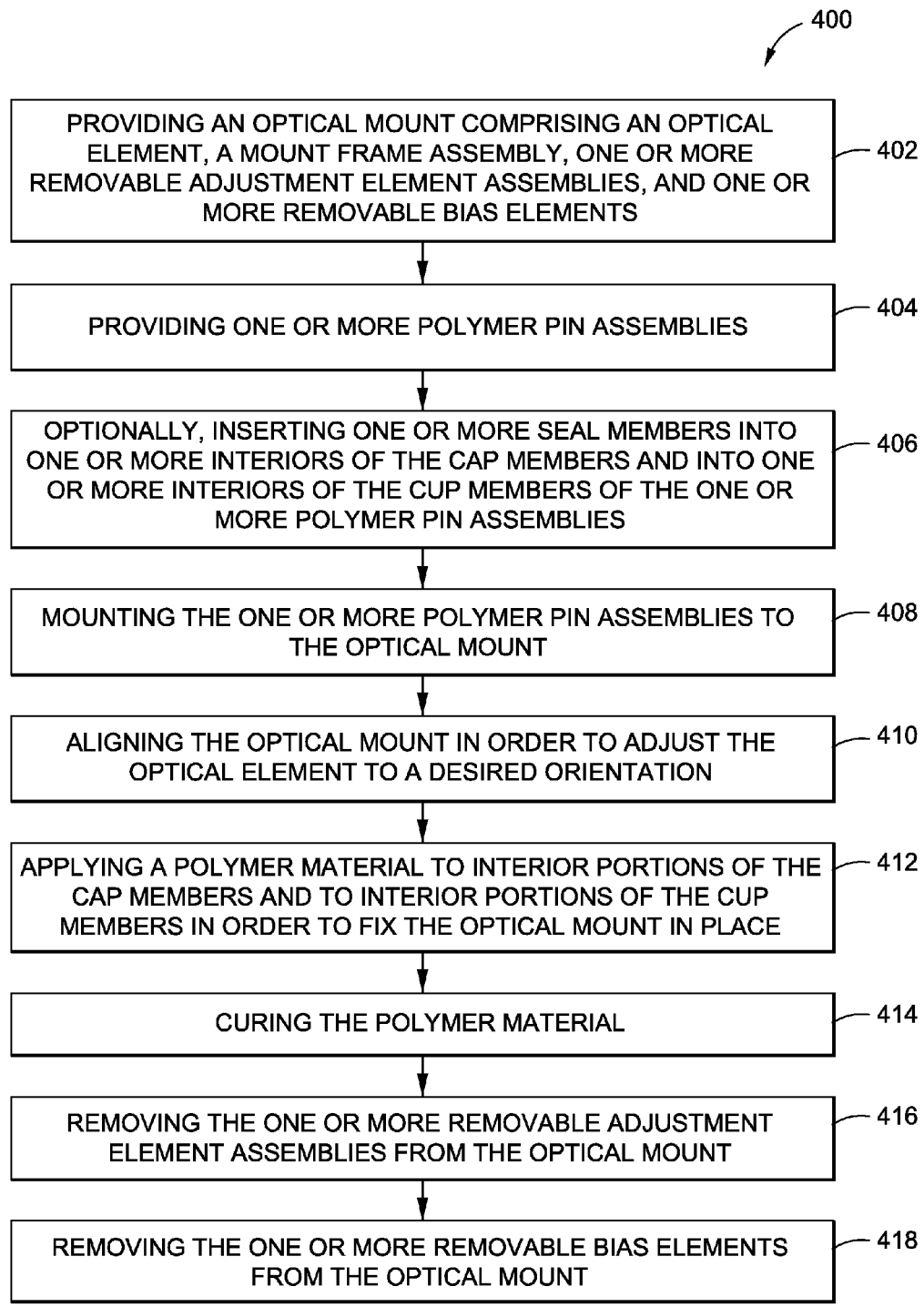
FIG. 14 is an illustration of a flow diagram of another embodiment of a method of the disclosure.

In another embodiment of the disclosure, there is provided a method 400 for adjusting an optical element 104, preferably in the form of a minor cell 110, using a polymer pin assembly 10 for an optical mount 100 (see FIG. 8). FIG. 14 is an illustration of a flow diagram of the method 400 of the disclosure. The method 400 comprises step 402 of providing an optical mount 100 comprising the optical element 104, a mount frame assembly 106, one or more removable adjustment element assemblies 112, and one or more removable bias elements 102 (see FIG. 8). The method 400 further comprises step 404 of providing one or more polymer pin assemblies 10. As discussed above and shown in FIGS. 1-3, 7, and 11, the polymer pin assembly 10 comprises a first cap member 12a and a second cap member 12b, each cap member 12a, 12b having a through opening 24. The polymer pin assembly 10 further comprises a first cup member 30a and a second cup member 30b, each cup member 30a, 30b being coupled to each respective cap member 12a, 12b. The polymer pin assembly 10 further comprises two ball bearing members 50, each ball bearing member 50 being disposed within each respective cup member 30a, 30b. The polymer pin assembly 10 further comprises a rod member 66 inserted through each cap member 12a, 12b and coupled to each ball bearing member 50. The method 400 may further comprise optional step 406 of inserting one or more seal members 92 into one or more interiors 20 of the cap members 12a, 12b and into one or more interiors 42 of the cup members 30a, 30b. The method 400 further comprises step 408 of mounting the one or more polymer pin assemblies 10 to the optical mount 100. The method 400 further comprises step 410 of aligning the optical mount 100 in order to adjust the optical element 104 to a desired orientation. Once the desired tip, tilt and piston adjustments and alignments are made, the method 400 further comprises step 412 of applying, preferably by injecting, a polymer material 132, preferably a liquid polymer material, into interior portions 136 (see FIG. 11) of the cap members 12a, 12b and into interior portions 134 (see FIG. 11) of the cup members 30a, 30b, in order to fix or freeze the optical mount 100 in place. The method 400 further comprises step 414 of curing the polymer material 132. The method 400 further comprises step 416 of removing the one or more removable adjustment element assemblies 112 from the optical mount 100. The method 400 further comprises step 418 of removing the one or more removable bias elements 102 from the optical mount 100.

Figure 15:
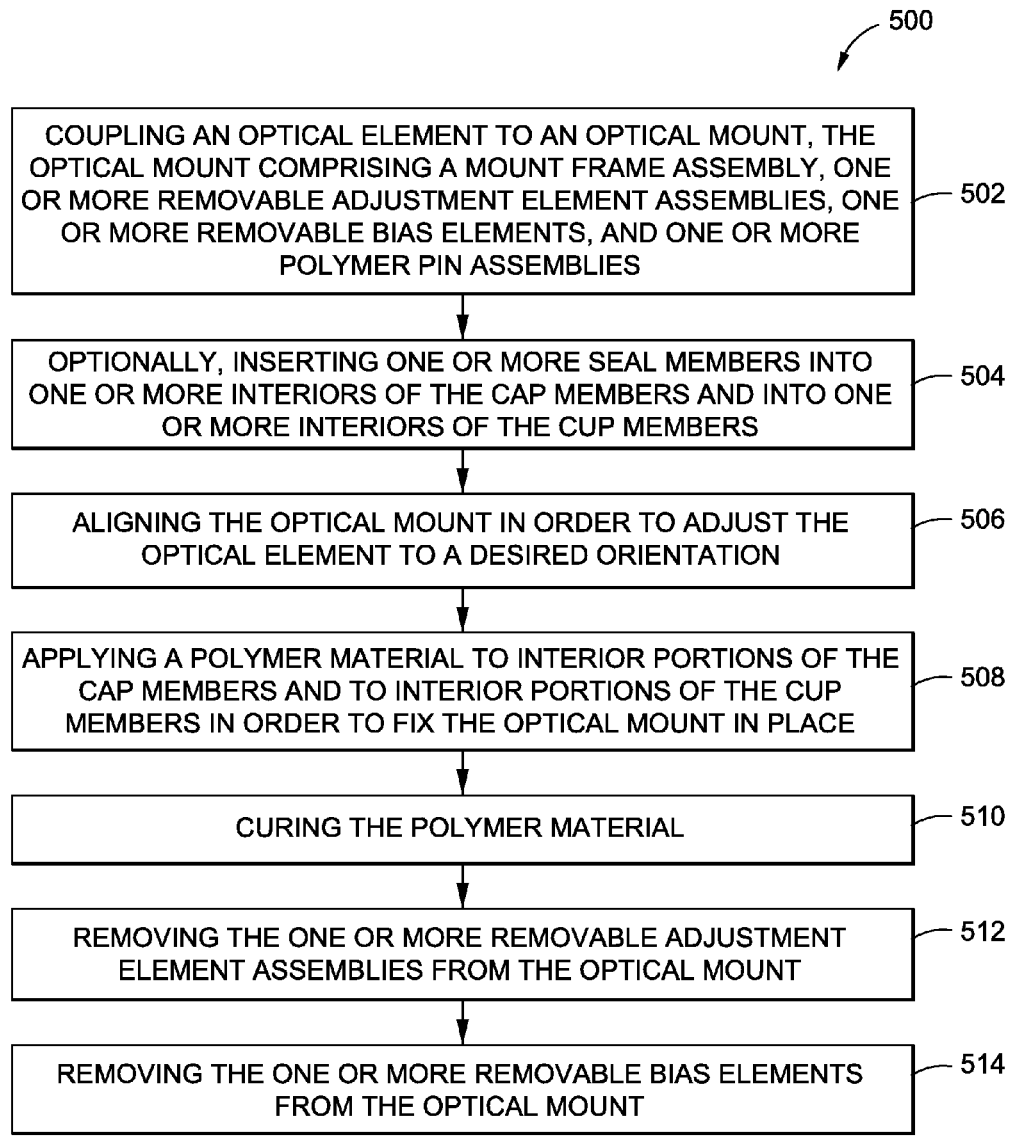
FIG. 15 is an illustration of a flow diagram of another embodiment of a method of the disclosure; and, FIG. 16 is an illustration of a front perspective view of one of the embodiments of a polymer pin optical mount incorporating one of the embodiments of the polymer pin assembly of the disclosure.

In another embodiment of the disclosure, there is provided a method 500 for adjusting an optical element 104 using a polymer pin optical mount 140 (see FIG. 16). FIG. 15 is an illustration of a flow diagram of the method 500 of the disclosure. The method 500 comprises step 502 of coupling the optical element 104, preferably in the form of a mirror cell 110, to a polymer pin optical mount 140. The polymer pin optical mount 140 comprises a mount frame assembly 106, one or more removable adjustment element assemblies 112 (see FIG. 9), one or more removable bias elements 102, and one or more polymer pin assemblies 10. As discussed above and shown in FIGS. 1-3, 7, and 11, the polymer pin assembly 10 comprises first and second cap members 12a, 12b, each cap member 12a, 12b having a through opening 24. The polymer pin assembly 10 further comprises first and second cup members 30a, 30b, each cup member 30a, 30b being coupled to each respective cap member 12a, 12b. The polymer pin assembly 10 further comprises two ball bearing members 50, each ball bearing member 50 being disposed within each respective cup member 30a, 30b. The polymer pin assembly 10 further comprises a rod member 66 inserted through each cap member 12a, 12b and coupled to each ball bearing member 50. The method 500 may further comprise optional step 504 of inserting one or more seal members 92 into one or more interiors 20 of the first and second cap members 12a, 12b and into one or more interiors 42 of the first and second cup members 30a, 30b. The method 500 further comprises step 506 of aligning the polymer pin optical mount 140 in order to adjust the optical element 104 to a desired orientation. The method 500 further comprises step 508 of applying a polymer material 132, preferably a liquid polymer material, to interior portions 136 (see FIG. 11) of the first and second cap members 12a, 12b and to interior portions 134 (see FIG. 11) of the first and second cup members 30a, 30b in order to fix the polymer pin optical mount 140 in place. The method 500 further comprises step 510 of curing the polymer material 132. The method 500 further comprises step 512 of removing the one or more removable adjustment element assemblies 112 from the polymer pin optical mount 140. The method 500 further comprises step 514 of removing the one or more removable bias elements 102 from the polymer pin optical mount 140.

One or more of the embodiments of the assemblies and methods of the disclosure provides numerous advantages. The disclosed embodiments provide for assemblies and methods for a polymer pin assembly for mounting to and use with an existing optical mount, as well as for incorporation into a polymer pin optical mount designed specifically with the polymer pin assembly. The disclosed embodiments of the assemblies and methods allow for stiffness and stability of the optical mount to be independent of adjustment resolution by the adjustment element assemblies and to be limited only by the stiffness of the optical element 104, such as the minor cell 110, and the mount frame assembly 106. Removal of the adjustment element assemblies 112 after application of the polymer material 132 and fixing of the optical mount in place allows for the removal of significant structural mass, in the form of the adjustment element assemblies 112 and the bias elements 102 from the optical mount, thus resulting in an ultra-lightweight optical mount. The disclosed embodiments of the polymer pin assembly 10 for use with an optical mount and disclosed embodiments of the polymer pin optical mount exhibit very low mass, very high stiffness such as high structural frequencies, and high stability, that is, they do not change when exposed to shock or vibration disturbances. The polymer pin assembly 10 and polymer pin optical mount may preferably be used in weight-constrained, high-vibration/shock environments. The polymer pin assembly 10 mounted to an optical mount, as well as the polymer pin optical mount, exhibit superior weight to stiffness/stability performance, provide superior adjustment resolution versus stiffness/stability, and provide improved conductive heat transfer over known optical mounts. Moreover, the disclosed embodiments provide for assemblies and methods for a polymer pin assembly and polymer pin optical mount that can release the polymer pin assembly 10 from the optical mount for the purpose of re-alignment and subsequent fixing in place or freezing of the optical mount. In addition, the polymer pin assembly 10 mounted to an optical mount, as well as the polymer pin optical mount, provide the advantage of heat conduction through the rod members 66 of the polymer pin assemblies 10. The rod members 66 may be fabricated in large diameters, and can be composed of a material having high thermal conductivity such as copper. Moreover, thermally conductive polymer material, such as thermally conductive epoxy, may be used to fix or freeze the adjustment element assemblies when increased heat dissipation is required.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A polymer pin assembly for an optical mount, the assembly comprising:
    two cap members, each cap member having a through opening;
    two cup members, each cup member being coupled to each respective cap member;
    two ball bearing members, each ball bearing member being disposed within each respective cup member;
    a rod member inserted through each cap member and coupled to each ball bearing member; and,
    a polymer material applied to interior portions of the cap members and applied to interior portions of the cup members after the polymer pin assembly is mounted to the optical mount.

2. The assembly of claim 1, further comprising one or more seal members inserted into one or more interiors of the cap members and into one or more interiors of the cup members.

3. The assembly of claim 1, wherein the polymer material is selected from the group consisting of a thermally conductive epoxy, a non-thermally conductive epoxy, and a paraffin.

4. The assembly of claim 1, wherein the polymer material causes the optical mount to be fixed in place which allows for removal of one or more adjustment element assemblies from the optical mount and allows for removal of one or more bias elements from the optical mount, thus resulting in a reduced overall weight of the optical mount.

5. The assembly of claim 1, wherein the cap members each have an interior threaded portion and the cup members each have an exterior threaded portion, such that each cap member is threadably coupled to each cup member.

6. The assembly of claim 1, wherein the ball bearing members comprise a first ball bearing with an interior threaded portion and a second ball bearing with a through opening, and further wherein the rod member has a first end with an exterior threaded portion for threaded coupling with the interior threaded portion of the first ball bearing, and wherein the rod member has a second end for insertion through the through opening of the second ball bearing.

7. The assembly of claim 1, wherein rod member comprises a material selected from the group comprising a low coefficient of expansion material, steel, a high thermal conductivity material, and copper.

8. An epoxy pin assembly for mounting to an optical mount, the assembly comprising:
    a first cap member having a through opening with an interior threaded portion for threaded attachment to a first cup member having an exterior threaded portion;
    a second cap member having a through opening with an interior threaded portion for threaded attachment to a second cup member having an exterior threaded portion;
    a first ball bearing member having an interior threaded portion and being disposed within an interior portion of the first cup member;
    a second ball bearing member having a through opening and being disposed within an interior portion of the second cup member;
    a rod member inserted through each cap member and having a first end with an exterior threaded portion for threaded attachment to the interior threaded portion of the first ball bearing member, and the rod member having a second end for insertion through the second ball bearing, so as to form a spaced coupling between the first cap member with the attached first cup member and the second cap member with the attached second cup member;
    one or more seal members inserted into one or more interiors of the first and second cap members and into one or more interiors of the first and second cup members; and,
    an epoxy material applied to interior portions of the first and second cap members and applied to interior portions of the first and second cup members after the epoxy pin assembly is mounted to the optical mount, wherein the epoxy material causes the optical mount to be fixed in place which allows for removal of one or more adjustment element assemblies from the optical mount and allows for removal of one or more bias elements from the optical mount, thus resulting in a reduced overall weight of the optical mount.

9. A polymer pin optical mount comprising:
    a mount frame assembly;
    an optical element coupled to the mount frame assembly via one or more retaining elements;

one or more removable adjustment element assemblies attached to the mount frame assembly for adjusting orientation of the optical element with respect to the mount frame assembly;

one or more removable bias elements attached to the mount frame assembly for holding the optical element against the one or more adjustment element assemblies;

one or more removable polymer pin assemblies mounted to the polymer pin optical mount via one or more pin mounting assemblies, the polymer pin assembly comprising:

two cap members, each cap member having a through opening;

two cup members, each cup member being coupled to each respective cap member;

two ball bearing members, each ball bearing member being disposed within each respective cup member;

a rod member coupled to each ball bearing member and inserted through each cap member; and, a polymer material applied to interior portions of the cap members and applied to interior portions of the cup members after the polymer pin assembly is mounted to the polymer pin optical mount, wherein the polymer material causes the polymer pin optical mount to be fixed in place which allows for removal of the one or more adjustment element assemblies from the polymer pin optical mount and allows for removal of the one or more bias elements from the polymer pin optical mount, thus resulting in a reduced overall weight of the polymer pin optical mount.

10. The assembly of claim 9, wherein the polymer pin optical mount further comprises one or more seal members inserted into one or more interiors of the cap members and into one or more interiors of the cup members.

11. The assembly of claim 9, wherein the polymer material is a liquid polymer material selected from the group consisting of a thermally conductive epoxy, a non-thermally conductive epoxy, and a paraffin.

12. A method for assembling a polymer pin assembly for an optical mount, the method comprising:

coupling a first cap member having a through opening to a first cup member;

coupling a second cap member having a through opening to a first cup member;

inserting a first ball bearing member into the first cup member;

inserting a second ball bearing member into the second cup member;

inserting a rod member through the first and second cap members;

coupling the rod member to the first ball bearing and to the second ball bearing; and, applying a polymer material to interior portions of the cap members and to interior portions of the cup members after the polymer pin assembly is mounted to the optical mount.

13. The method of claim 12, further comprising before inserting the rod member through the first and second cap members, inserting one or more seal members into one or more interiors of the cap members and into one or more interiors of the cup members.

14. The method of claim 12, wherein the polymer material is selected from the group consisting of a thermally conductive epoxy, a non-thermally conductive epoxy, and a paraffin.

15. The method of claim 12, wherein the polymer material causes the optical mount to be fixed in place which allows for removal of one or more adjustment element assemblies from the optical mount and allows for removal of one or more bias elements from the optical mount, thus resulting in a reduced overall weight of the optical mount.

16. A method for assembling an epoxy pin assembly for mounting to an optical mount, the method comprising:

threadably attaching a first cap member having a through opening and an interior threaded portion to a first cup member having an exterior threaded portion;

threadably attaching a second cap member having a through opening and an interior threaded portion to a second cup member having an exterior threaded portion;

inserting a first ball bearing member having an interior threaded portion into the first cup member;

inserting a second ball bearing member having a through opening into the second cup member;

inserting one or more seal members into one or more interiors of the first and second cap members and into one or more interiors of the first and second cup members;

inserting a rod member through the first cap member and through the second cap member, the rod member having a first end with an exterior threaded portion and a second end;

threadably attaching the first end of the rod member to the interior threaded portion of the first ball bearing member;

inserting the second end of the rod member through the through opening of the second ball bearing member, so as to form a spaced coupling between the first cap member with the attached first cup member and the second cap member with the attached second cup member; and, applying an epoxy material to interior portions of the cap members and to interior portions of the cup members after the epoxy pin assembly is mounted to the optical mount, wherein the epoxy material causes the optical mount to be fixed in place which allows for removal of one or more adjustment element assemblies from the optical mount and allows for removal of one or more bias elements from the optical mount, thus resulting in a reduced overall weight of the optical mount.

17. A method for adjusting an optical element using a polymer pin assembly for an optical mount, the method comprising:

providing an optical mount comprising the optical element, a mount frame assembly, one or more removable adjustment element assemblies, and one or more removable bias elements;

providing one or more polymer pin assemblies, each polymer pin assembly comprising:

two cap members, each cap member having a through opening;

two cup members, each cup member being coupled to each respective cap member;

two ball bearing members, each ball bearing member being disposed within each respective cup member; and, a rod member inserted through each cap member and coupled to each ball bearing member;

mounting the one or more polymer pin assemblies to the optical mount;

aligning the optical mount in order to adjust the optical element to a desired orientation;

applying a polymer material to interior portions of the cap members and to interior portions of the cup members in order to fix the optical mount in place;

curing the polymer material;

removing the one or more removable adjustment element assemblies from the optical mount; and, removing the one or more removable bias elements from the optical mount.

18. The method of claim 17, further comprising before mounting the polymer pin assemblies, inserting one or more seal members into one or more interiors of the cap members and into one or more interiors of the cup members.

19. The method of claim 17, wherein the polymer material is a liquid polymer material selected from the group consisting of a thermally conductive epoxy, a non-thermally conductive epoxy, and a paraffin.

20. A method for adjusting an optical element using a polymer pin optical mount, the method comprising:
coupling the optical element to a polymer pin optical mount, the polymer pin optical mount comprising:
a mount frame assembly;
one or more removable adjustment element assemblies;
one or more removable bias elements; and,
one or more polymer pin assemblies, each polymer pin assembly comprising:
two cap members, each cap member having a through opening;
two cup members, each cup member being coupled to each respective cap member;
two ball bearing members, each ball bearing member being disposed within each respective cup member; and,
a rod member inserted through each cap member and coupled to each ball bearing member;
aligning the polymer pin optical mount in order to adjust the optical element to a desired orientation;
applying a polymer material to interior portions of the cap members and to interior portions of the cup members in order to fix the polymer pin optical mount in place;
curing the polymer material;
removing the one or more removable adjustment element assemblies from the polymer pin optical mount; and,
removing the one or more removable bias elements from the polymer pin optical mount.

21. The method of claim 20, further comprising before aligning the polymer pin optical mount, inserting one or more seal members into one or more interiors of the cap members and into one or more interiors of the cup members.

22. The method of claim 20, wherein the polymer material is a liquid polymer material selected from the group consisting of a thermally conductive epoxy, a non-thermally conductive epoxy, and a paraffin.

* * * * *